United States Patent [19]
Caroli

[11] 3,741,698
[45] June 26, 1973

[54] STICK INJECTOR WITH PAPER FEED

[75] Inventor: Italo Caroli, Westmount, Quebec, Canada

[73] Assignee: DBM Industries Limited, Montreal, Quebec, Canada

[22] Filed: June 16, 1971

[21] Appl. No.: 153,778

[52] U.S. Cl. .......................... 425/125, 425/DIG. 219
[51] Int. Cl. .............................................. A23g 5/02
[58] Field of Search.................... 425/126, 123, 125, 425/126 B; 249/92; 214/1 BC, 1 Q; 294/87 SH; 198/131, 179, 25, 209, 210; 62/340, 345, 356

[56] References Cited
UNITED STATES PATENTS

| | | | |
|---|---|---|---|
| 3,035,686 | 5/1962 | Hoyer | 198/209 |
| 2,700,347 | 1/1955 | Gram et al. | 425/126 |
| 2,892,423 | 6/1959 | Glass | 425/126 |
| 1,236,992 | 8/1917 | Sjostrom | 425/126 X |
| 2,705,857 | 4/1955 | Fox et al. | 425/126 X |
| 3,370,881 | 2/1968 | Renfroe | 294/104 X |

*Primary Examiner*—J. Spencer Overholser
*Assistant Examiner*—David S. Safran
*Attorney*—Cushman, Darby & Cushman

[57] ABSTRACT

Apparatus is described for inserting sticks into liquid confection material. That material is contained in a mold which is being moved along through a bath of refrigerant. At least one and preferably many stick-gripping mechanisms that include a fixed element and a clamping element biased to releasably retain a stick therebetween are mounted on each arm of a supporting spider assembly. That spider assembly includes a plurality of arms that are disposed generally in a common plane, and is provided with means for reciprocally moving the spider arms and gripping mechanisms transversely of that plane to effect both picking up and releasing of the sticks. In addition, the supporting spider assembly is indexable to pick-up sticks from a supply source at a pick-up station and transfer the sticks to a stick-release station. The supply of sticks comprises a strip of perforated paper or like material, with the sticks being supported in perforations in said strip. A stick-transferring conveyor is normally disposed over the moving molds at the stick-release station. This conveyor includes a plurality of stick-supporting flights which are driven in synchronism with the moving molds. In that way the sticks can be inserted into the liquid confection material and supported therein until the material has itself hardened sufficient to support the sticks. Each stick-supporting flight includes a preformed backing leement and a biasing member cooperating therewith to frictionally and releasably retain each stick therebetween.

9 Claims, 7 Drawing Figures

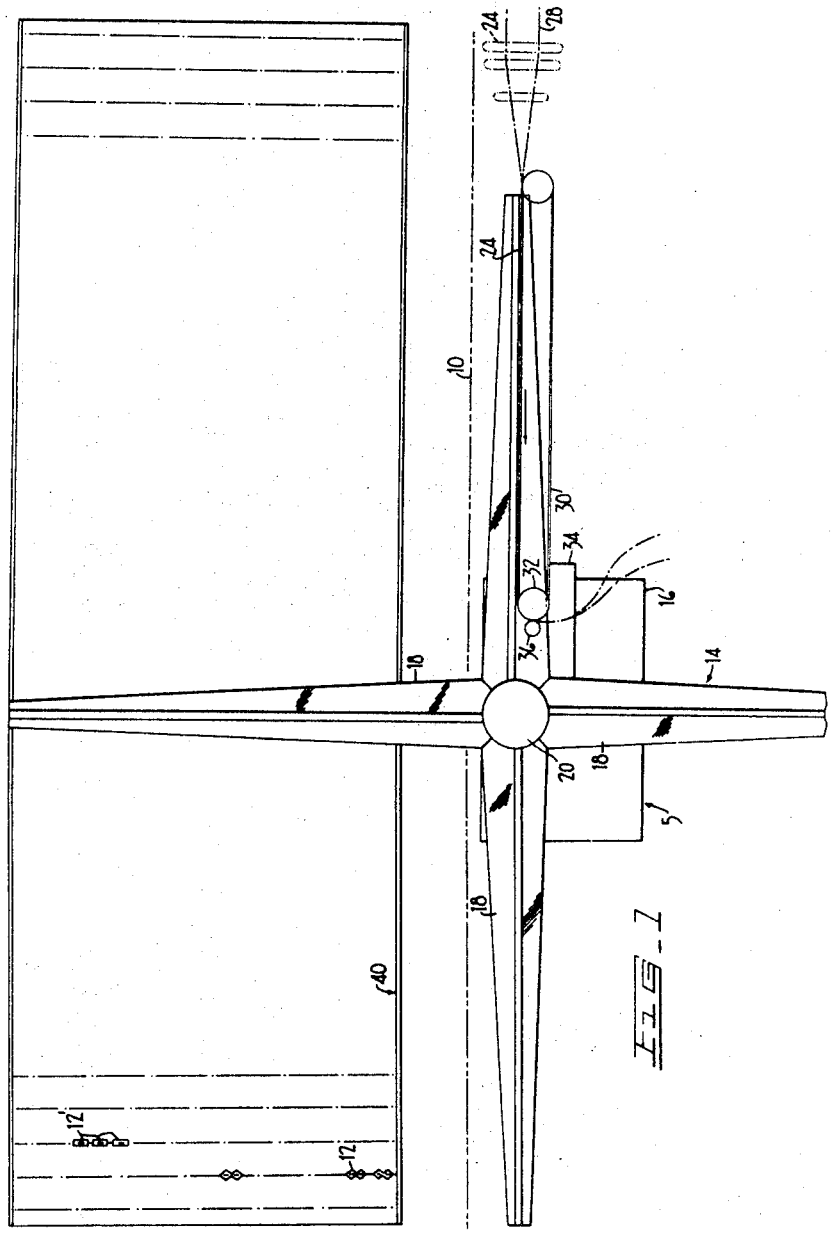

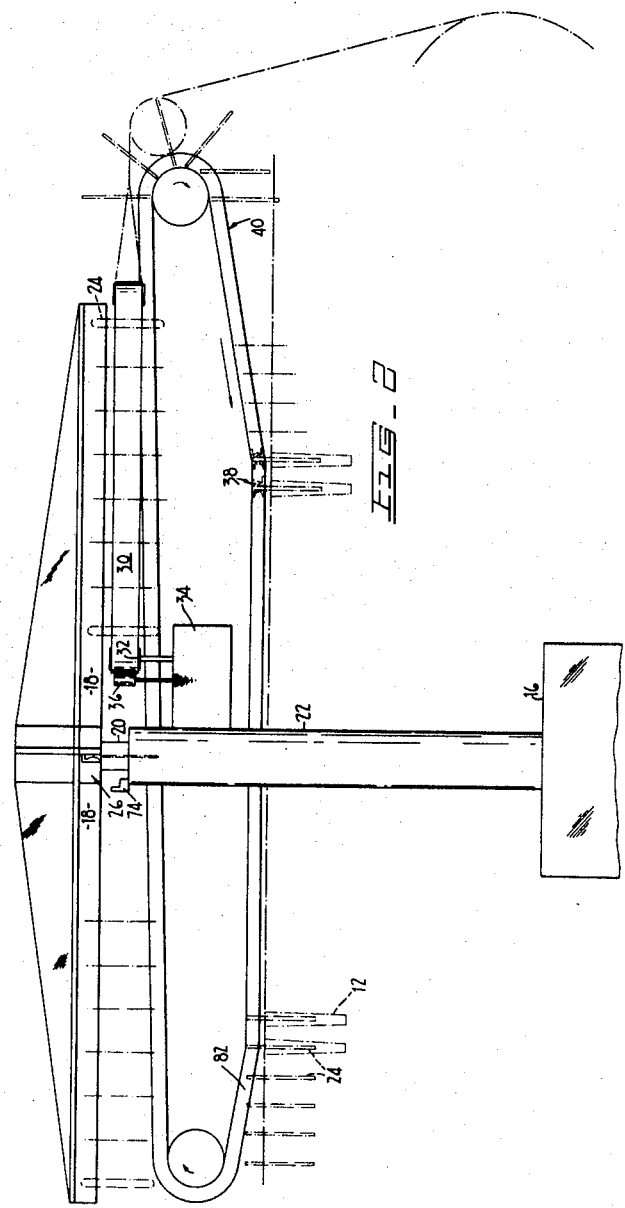

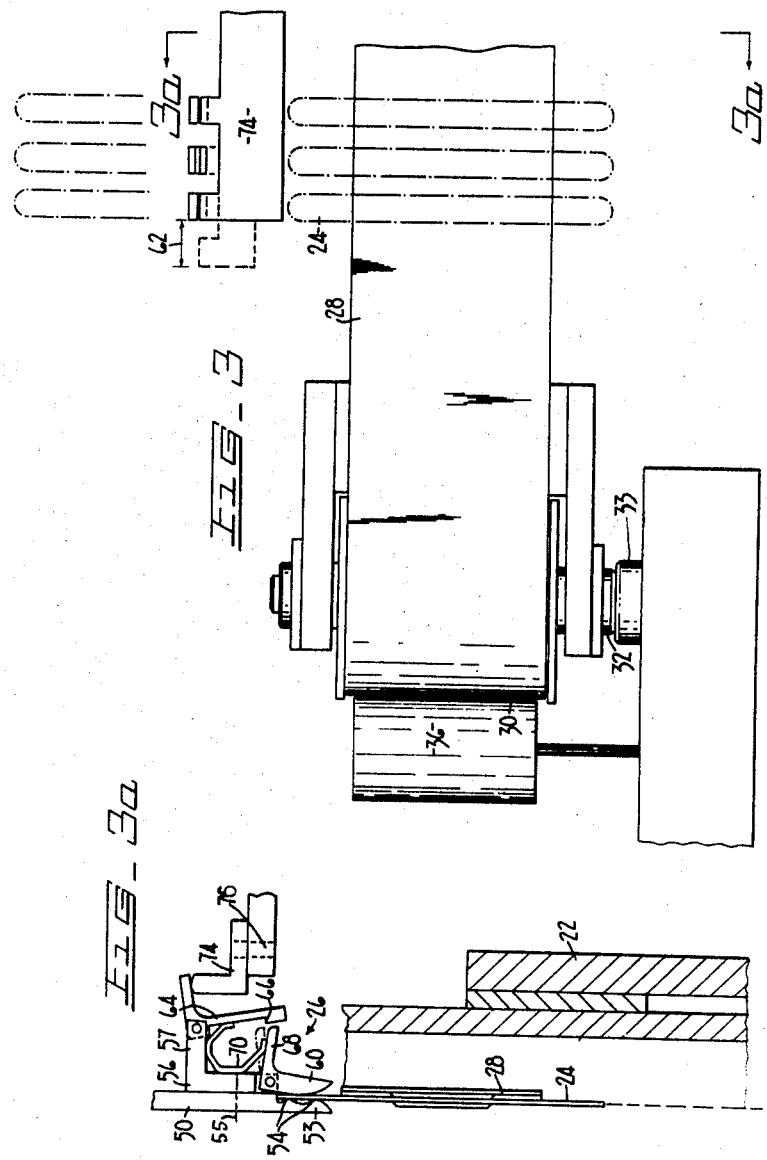

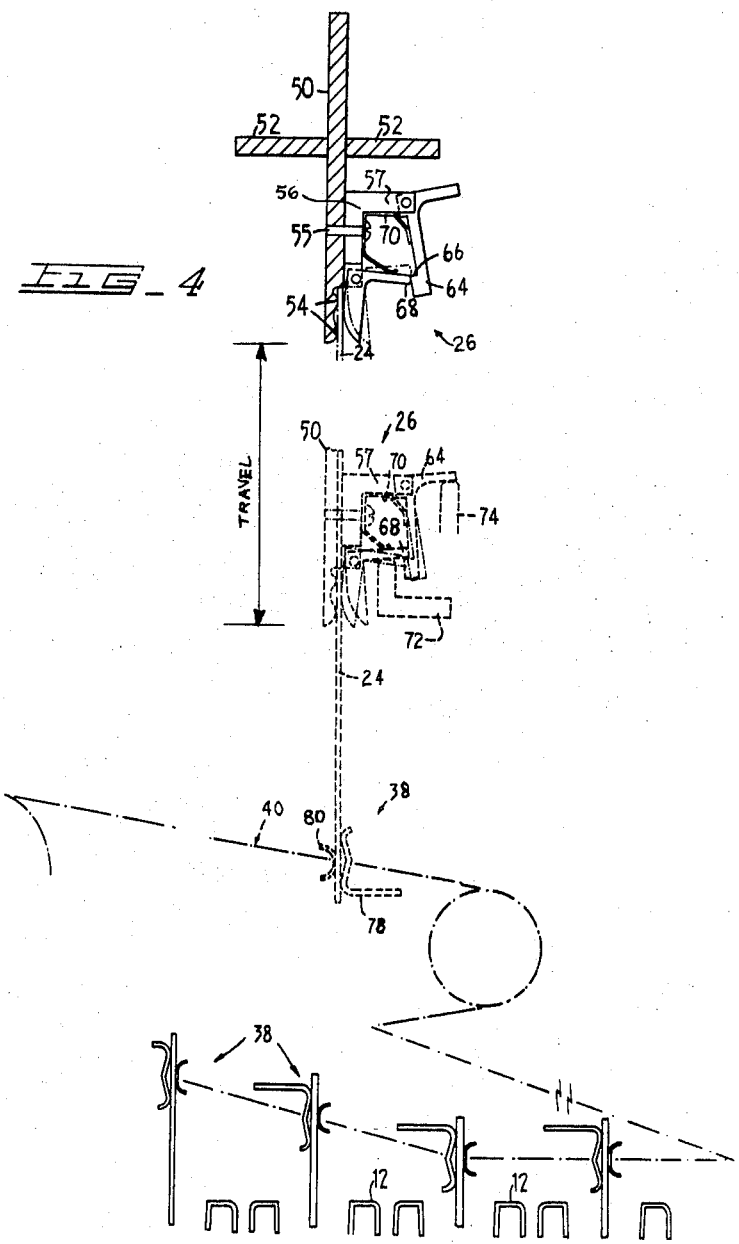

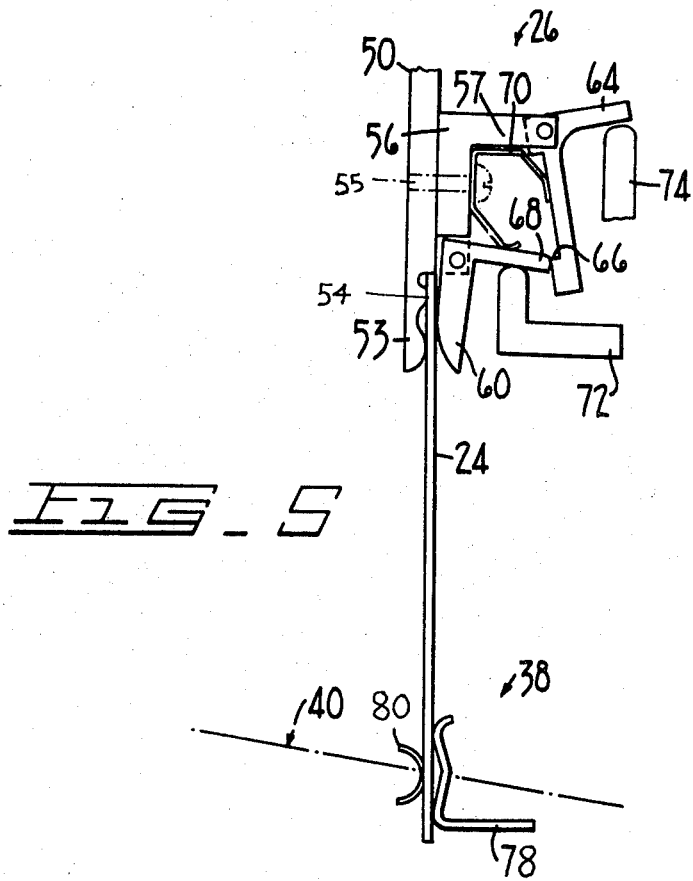

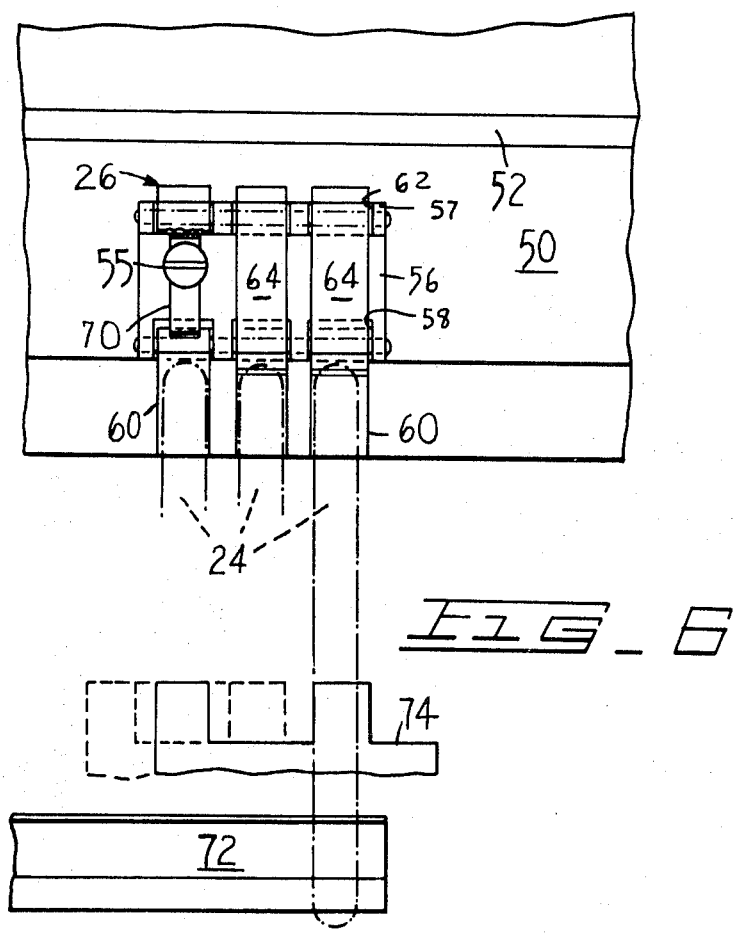
FIG_6

STICK INJECTOR WITH PAPER FEED

This invention is concerned with inserting sticks into confection material such as an ice cream emulsion or a popsicle mixture. More particularly, the present invention relates to a system whereby sticks are picked up from perforated strip means that support the same at one station and are transferred to a stick transferring conveyor at a second station, which effects insertion of the sticks into the confection material while it is still liquid in form.

BACKGROUND OF THE INVENTION

Stick-injecting machines are well known in this art, which apply a predetermined amount of pressure to the ends of sticks carried by the same for injecting such sticks into an ice cream or popsicle confection material which is semi-solidified. Once the stick has been injected, it is supported by the partially hardened confection material until final hardening, i.e., freezing of that material has occurred. Although such a technique has been practised for many years, it has several weaknesses. In the first instance, the sticks which are involved must be constructed to high standards of quality, being very straight, free of knots or other structural defects in the wood, and smooth, hence not prone to splintering or giving off slivers. These many requirements in the quality of sticks that can be accepted by present day stick injecting equipment, result in a significant reject rate of sticks being produced for this intended purpose. Another problem arises because of the very different characteristics of an ice cream emulsion and the popsicle confection material which is primarily aqueous in content. It is well known from the phase diagram for water that there is a rather fine distinction between the conditions under which water is in a liquid form and that in which it is solid in form. The transition is quite rapid. On the other hand, an ice cream emulsion hardens and solidifies much more gradually. These differences are manifested in the requirement that, in practice, some operating personnel are required to ensure that the prior art stick-injecting equipment is properly located so that sticks are injected into confection material at the desired consistency or hardness. Naturally, if the confection material is still liquid, the sticks will fall over and simply float therein. An attempt to inject sticks into confection material which is too hard especially a popsicle mixture that is largely frozen water, greatly increases the chances of breaking the sticks or injecting them in the material at an orientation which is not acceptable. Despite the very large volumes of popsicles and ice cream confections that are sold annually, relatively few significant changes have been made in the basic techniques involved over the last twenty or twenty-five years.

SUMMARY OF THE INVENTION

The present invention overcomes many of the disadvantages of equipment and techniques used in this art in the past. Rather than attempting to inject sticks under a controlled amount of pressure into confection material that is already partly hardened, the present invention provides that sticks are inserted into confection material which is still liquid in form. Hence this eliminates the problems associated with determining the location at which optimum hardness of that material is found, for injection purposes. Even more importantly, the apparatus to be described below will function satisfactorily to a large extent independently of the quality of the sticks with which it is to be used.

In accordance with one broad form of the invention, there is provided apparatus for inserting a stick into liquid confection material being carried along in a moving mold, comprising: supply means in the form of a perforated strip carrying a multiplicity of sticks for providing one of said sticks to a stick-gripping mechanism, said mechanism being adapted to releasably hold the stick in a selected configuration; support means for carrying at least one of said stick-gripping mechanisms, and being movable to enable the sticks to be picked up and transferred from a stick pick-up station to a stick release station; and, stick tranferring conveyor means located at said release station for receiving and retaining said sticks in the configuration selected, said conveyor means being adapted to be selectively driven in synchronism with the motion of said moving molds for enabling the conveyor means to insert said stick into the liquid confection and support the same therein until the confection material has solidified, the conveyor means being operable for automatically releasing the stick after a period of time when the stick is being supported by the solidified confection material.

The present invention therefore provides an apparatus which inserts sticks into liquid confection material, and enables sticks to be supplied on perforated strip material.

BRIEF DESCRIPTION OF THE DRAWINGS

The foregoing apparatus together with the advantages and features thereof will now be described in detail, with reference being made to the accompanying drawings which merely illustrate the present invention, and in which:

FIG. 1 is a top plan view illustrating schematically one preferred embodiment of this invention;

FIG. 2 is a side elevation view of the apparatus of FIG. 1;

FIG. 3 is also a side elevation view showing in part some of the detail of the transfer spider assembly used in the apparatus of FIGS. 1 and 2;

FIG. 3A is an end elevation view taken in section along line 3A—3A of FIG. 3;

FIGS. 4 and 5 are end elevation views showing in part one of the stick-gripping mechanisms; with FIG. 4 showing that mechanism in full lines in a stick retaining configuration, while FIG. 5 shows the same mechanism in a stick releasing configuration with a stick being loaded onto a flight carried by the stick transferring conveyor of FIGS. 1 and 2; and FIG. 6 is a side elevation view showing one cluster of stick-gripping mechanisms as they are mounted on the spider assembly of FIG. 1.

DESCRIPTION OF THE PREFERRED EMBODIMENTS

Turning now to the drawings, FIG. 1 shows schematically a bath 10 of refrigerant used to solidify and freeze a confection material contained in a plurality of molds 12. These molds 12 are supported in a manner well known in this art from conveyor means associated with the refrigerant bath 10. The molds 12 are generally slightly tapered longitudinally thereof and will be of a form suitable for providing popsicles having two sticks therein (12 in FIG. 1) or ice cream bars which have one stick therein (12' in FIG. 1). The apparatus used to supply the confection to the molds forms no part of this invention. In addition, the construction and control of the bath of refrigerant and the temperatures at which it is kept are well known to those skilled in this art and need not be described in detail here. It is sufficient for present purposes to state that the bath 10 of refrigerant is usually of some considerable length, say for example, approximately 20 feet long and may contain a brine solution or other such refrigerant material. The temperature at which this bath 10 of refrigerant is normally kept will be below the freezing temperature of water, that is, below 32°F. or 0°C.

A spider assembly 14 is supported on a base housing 16 that is mounted on the floor beside the bath 10 of refrigerant. The spider assembly 14 has, in this instance, four horizontally extending arms 18 that are somewhat *t*-shaped in cross section thereof in order to be structurally rigid. The "tee" is made up of generally vertically oriented web sections in horizontally oriented sections. These arms 18 are each supported from a rotatable central column or shaft 20. For reasons of cleanliness and safety, this rotatable column or shaft 20 is normally housed within an enclosure 22 that may be of sheet metal or the like. The base housing 16 includes drive means for rotating the shaft 20, as well as structure that allows that column and arms 18 to be selectively moved reciprocally up and down as desired. U.S. Pat. No. 3,035,686 for example shows a spider assembly having similar movements. This reciprocal movement will be timed so as to enable a stick 24 to be picked up as seen in FIG. 3A by a stick-gripping mechanism 26 (also seen in FIGS. 4–6) from a strip 28 of perforated paper or like material. The sticks 24 are carried along in spaced apart relation and in a selected configuration by the perforations in the paper strip 28.

In order to pick up sticks 24 being conveyed by the perforated strip 28, the strip is fed along by a belt conveyor 30 disposed beside the bath 10 of refrigerant, at a stick pick-up station (best seen in FIG. 2). This conveyor 30 is driven by means of a spindle and shaft assembly 32 that is operatively connected by spur gears 33 (FIG. 3) to drive means (not shown) contained within a housing 34 being supported by the column housing 22. An idler roll 36 (FIG. 1) assists in keeping the strip 28 in close contact with the belt conveyor 30. It should be noted here that some of the molds 12 will be used to produce popsicles having two sticks each. Other molds shown at 12' are for producing ice cream bars that have only one stick each. Hence, in order to accommodate the particular type of confection material being produced, the strip 28 will be perforated and contain sticks that are properly spaced for either a single stick, or a double stick configuration. When a full complement of sticks 24 have been brought into the stick pick-up station, the transfer spider assembly 14 is moved reciprocally downwardly, to the position seen in FIG. 3A. FIG. 4 indicates the positioning of various constituent parts of the stick-gripping mechansim 26 when a stick is being picked up from the strip 28, and a stick-releasing condition shown in FIG. 5. FIG. 6 shows a cluster of three mechanisms 26. The details of this mechanism 26 will be discussed below.

Once the stick-gripping mechanism 26 has picked up a stick 24 from the strip 28, the supporting structure within base housing 16 then causes the transfer spider assembly 14 to be lifted upwardly and indexed counterclockwise, as seen in FIG. 1. After indexing through 90° in this instance, the transfer spider assembly is again moved downwardly to the position shown in FIG. 5, from that shown in FIG. 4. In the down position, each stick-gripping mechanism 26 causes the sticks 24 being supported by th same to become engaged by a stick-supporting flight 38 carried by a stick-transferring conveyor 40. As will be explained further below, movement of the stick-gripping mechanism 26 over the last one eighth inch, say, of downward travel causes the stick 24 to be released simultaneously with the engagement thereof by the stick-supporting flight 38. It should also be noted that as the transfer spider assembly 14 has been moved downwardly to release a stick 24 to the flight 38, another arm 18 and stick-gripping mechanisms 26 carried thereon have been lowered to once again pick up additional sticks 24 from the strip 28 at the stick pick-up station. This strip 28 will, of course, have been advanced to bring more sticks 24 into the pick-up area. Hence, it will be apparent that the feed motion of the strip 28 will be in synchronism with the rotatable indexing motion of the spider assembly 14. To this end, the spur gear 33 or belt and pulley arrangement can be used to couple the shaft 20 to the shaft and spindle assembly 32. Such coupling actually takes place within the enclosure 34. It will be apparent, however, that whatever arrangement is used to couple the shaft 20 to the spindle and shaft assembly 32, it will have to permit the axial movement of that shaft 20 required to accommodate the reciprocating movement of the transfer spider assembly 14 up and down.

With reference now to FIGS. 3–6, it will be seen from FIG. 4 that each arm 18 of the transfer spider assembly 14 comprises a generally vertically extending web portion 50 and a laterally extending web portion 52. The lower portion of the web 50 has been cut away and machined at 53 to form a fixed backing element which has two raised portions 54 thereon for "point" contact with the stick 24. An L-shaped base member 56 is secured to the lower portion of the vertically extending web 50. The downwardly extending arm of base member 56 has been notched as shown at 58 in FIG. 6 and bored to enable the pivotal mounting thereon of a plurality of clamping elements or fingers 60. It will be seen especially from FIGS. 3A, 4 and 5 that the pivotally mounted clamping element 60 co-operates with the preformed portion 54 (the fixed element) to enable gripping the stick 24 therebetween. The laterally extending arm of the base member 56 is shown at 57 and is also notched and bored as shown at 62 in FIG. 6 to facilitate pivotally mounting a locking element 64 thereon. Each locking element 64 is also of a general L-shape, however, the downwardly extending arm is provided with a shoulder 66 that is adapted to engage the downwardly facing surface of a laterally extending arm 68 of the clamping element 60. A spring element 70 is secured by suitable fastening means to the base member 56 and web portion 50, and serves to bias both the locking element 64 and clamping element 60 in a clockwise direction, as seen in FIGS. 3–5.

In order to enable each stick 24 to be released by the mechanism 26, an unlatch bar 72 is supported from the column housing 22 of the spider assembly 14. This can best be seen in FIG. 2. In addition, a stop member 74 is also provided on a slidable selection bar 76 (see FIGS. 3 and 3A) which is supported in a manner allowing lateral movement only. In this way the bar 76 will engage the generally laterally extending arm of the L-shaped locking element 64. Such engagement releases shoulder 66 from the surface of laterally extending arm 68 and thus allows the gripping element 60 to be moved by the spring 70 to an operative, stick-gripping position. That position is shown in FIG. 4 while FIG. 5 shows the stick-gripping mechanism 26 in a stick-releasing configuration, or alternatively, in a configuration in which it is about to pick up a new supply of sticks 24.

The transfer conveyor 40 can, for example, include two continuous chains that are spaced laterally apart, serving to carry the stick-supporting flights 38 by opposite ends of the same. These flights 38 include a preformed backing element 78 that may be of sheet metal or the like, and a spring element 80 that is biased into contact with the backing element 78. The biasing force is relatively small and hence it is easy for a stick 24 to be inserted therebetween. On the other hand, that biasing force is sufficiently strong to support the sticks 24 in position as they are conveyed from a receiving station and the configuration shown in FIG. 4 to a stick-inserting station and supporting zone shown in FIG. 2. It will be seen from the latter that the sticks 24 are merely brought into the molds 12 containing the confection material in question, still in a liquid form, and supported in the same in proper orientation until such time as the material has hardened due to the cooling action of the refrigerant in bath 10. At some predetermined distance downstream, (FIG. 1) where the confection material has hardened adequately, the lower run of the transfer conveyor 40 angles upwardly as shown at 82 in FIG. 2. Under those conditions, the restraining force of the stick 24 as it is frozen in the confection material easily overcomes the slight biasing pressure generated by the spring element 78 in the stick-supporting flight 38. Htnce, the sticks are easily "released" after the confection material has frozen.

The present apparatus therefore provides an arrangement for which sticks to be inserted into confections being produced, can be supplied on strips perforated for carrying the same. The present apparatus centres over the sticks that are disposed in an upright orientation and easily removes them, gripping the same between two relatively lightly biased finger elements.

Various modifications and changes are possible. It is intended, however, to encompass all such changes and modifications within the spirit of this invention as would be apparent to one skilled in this art, by the claims below.

The embodiments of the invention in which an exclusive property or privilege is claimed are defined as follows:

1. Apparatus for inserting sticks in a preselected configuration into liquid confection material carried in a mold movable through a bath of refrigerant; comprising:

support means positionable adjacent the bath of refrigerant, said support means being actuatable to reciprocate generally vertically, and to rotate with an indexing motion about an axis;

support arms carried by the support means and extending therefrom;

at least one stick-gripping mechanism supported on each arm, each said mechanism being operable in response to reciprocation of the support means to pick up sticks in said preselected configuration from a perforated strip supply thereof, and to release sticks at a stick-release station; and stick transferring conveyor means positioned in operative relation to the bath of refrigerant, said conveyor means being operable to receive said sticks from the stick-gripping mechanism at the stick-release station and releasably retain such sticks, said conveyor means operating to insert said sticks into the liquid confection material, to support such sticks while the confection material hardens, and being adapted to release said sticks automatically for retention by the confection material after solidification thereof.

2. The apparatus of claim 1, wherein the perforated strip supply supports a multiplicity of sticks in spaced apart, sequential relation, and in said pre-selected configuration.

3. The apparatus of claim 2, wherein said support means comprises a transfer spider assembly with a plurality of arms which define said support arms, said spider assembly including means for providing reciprocal motion to the stick-gripping mechanism causing sticks to be picked up from said strip supply as well as providing an indexing motion to position said arms and stick-gripping mechanisms with sticks therein for deposition in said stick transferring conveyor means.

4. The apparatus of claim 2, wherein said stick transferring conveyor means includes a plurality of stick-supporting flights, each flight comprising a backing element and a biasing member that co-operates therewith to frictionally retain said stick between the same.

5. The apparatus of claim 3, wherein said transfer spider serves to dispose a plurality of said stick-gripping mechanisms generally in a common plane, the transfer spider reciprocally moving said arms and stick-gripping mechanisms perpendicularly of said plane to effect both picking up, and releasing, sticks.

6. The apparatus of claim 2, wherein each stick-gripping mechanism includes a fixed element and a clamping element biased towards the fixed element, said elements being mounted on a common base carried by said support arms ; a locking bar engageable with each fixed element to maintain elements apart; and a fixed unlatch bar, said unlatch bar causing the locking bar to be tripped in response to reciprocal movement of the support means causing sticks to be gripped for subsequent transfer to said stick release station.

7. Apparatus for inserting sticks into liquid confection material contained in a mold movable through a bath of refrigerant, in an ice cream machine, comprising:

means for feeding perforated strip material through a stick pick-up station, said material carrying sticks in perforations therein in a selected configuration;

a plurality of stick-gripping mechanisms including a fixed element and a clamping element biased towards the former, said elements cooperating to retain a stick releasably therebetween;

a supporting spider assembly having outwardly projecting arms for carrying the stick-gripping mechanisms, including drive means causing vertically reciprocal movement thereof, and also causing the gripping mechanisms to be indexed to pick up sticks from said strip material in the pick-up station and transfer the sticks to a stick-release station; and stick transferring conveyor means positionable over the molds at the stick-release station, said conveyor means including a plurality of stick-supporting flights and being adapted to be selectively driven in synchronism with movement of the molds to cause sticks to be inserted into the liquid confection material and supported therein until said material has hardened, said flights releasably supporting the sticks in the mold until the confection material has hardened, the conveyor being adapted to cause the stick-supporting flights to release the sticks automatically for retention in the hardened confection material.

8. The apparatus of claim 7, wherein the plurality of stick-supporting flights each have two opposite ends to support said flights on two endless chains, each flight including a preformed backing element for contacting each stick at two locations only and a biasing member cooperating with said backing element to retain each stick frictionally and releasably therebetween.

9. The apparatus of claim 8, wherein said spider assembly comprises a transfer spider having a plurality of said outwardly projecting arms, each arm serving to mount a plurality of said stick-gripping mechanisms in clusters of three disposed generally in a common plane, the transfer spider assembly including means for indexing and reciprocating said arms and stick-gripping mechanisms thereon transversely to said common plane to cause both picking up, and releasing, of sticks being transferred thereby.

* * * * *